United States Patent [19]

Weber et al.

[11] 4,379,134

[45] Apr. 5, 1983

[54] PROCESS OF PREPARING HIGH PURITY ALUMINA BODIES

[75] Inventors: Willis W. Weber, South Salem, N.Y.; Joseph A. Herbst, Turnersville, N.J.

[73] Assignee: Union Carbide Corporation, Danbury, Conn.

[21] Appl. No.: 347,336

[22] Filed: Feb. 11, 1982

Related U.S. Application Data

[63] Continuation-in-part of Ser. No. 234,205, Feb. 13, 1981, abandoned.

[51] Int. Cl.³ .................................................. C01F 7/02
[52] U.S. Cl. .................................... 423/626; 423/628; 423/630
[58] Field of Search ................ 423/626, 628, 630, 625

[56] References Cited

U.S. PATENT DOCUMENTS

| | | | |
|---|---|---|---|
| 3,392,125 | 7/1968 | Kelly et al. | 423/628 |
| 3,850,849 | 11/1974 | Kivusky et al. | 423/626 |
| 3,894,963 | 7/1975 | Gerdes et al. | 423/626 |
| 3,950,507 | 4/1976 | Boreskov et al. | 423/626 |
| 3,975,509 | 8/1976 | Royer et al. | 423/626 |
| 4,048,295 | 9/1977 | Wassermann et al. | 423/626 |
| 4,102,978 | 7/1978 | Kivusky et al. | 423/626 |

*Primary Examiner*—Herbert T. Carter
*Attorney, Agent, or Firm*—Gerald L. Coon

[57] ABSTRACT

High purity alpha-alumina bodies useful as catalyst supports are made by peptizing boehmite alumina in an acidic mixture containing fluoride anions, extruding the peptized alumina into shaped bodies and drying and calcining the bodies. The alpha-alumina bodies are characterized by a narrow pore-size distribution, having 85 percent of the total pore volume comprising pores of a diameter of from 10,000 to 200,000 Angstroms and by a surface area of less than one square meter per gram.

23 Claims, No Drawings

PROCESS OF PREPARING HIGH PURITY ALUMINA BODIES

This is a continuation-in-part of U.S. patent application Ser. No. 234,205, filed Feb. 13, 1981, abandoned.

BRIEF SUMMARY OF THE INVENTION

1. Technical Field

The invention relates to high purity alpha-alumina bodies and their preparation. The bodies are useful as catalyst supports and can be doped or impregnated with appropriate metals or cations to obtain desired catalytic properties.

2. Background Art

In the manufacture of catalysts, inert shapes or bodies, usually of a metal oxide such as alumina, are doped or impregnated with metals or ions such as metal ions or ammonium ions. The nature of the metals or ions is chosen to obtain a desired catalytic activity. It is desirable that the catalyst supports or bodies be in themselves inert and exhibit no catalytic activity which may interfere with the activity of the added metals or ions. Impurities that also exhibit catalytic activity are also undesirable in the support bodies.

With the introduction of high purity boehmite-type alumina, principally made by the hydration of aluminum alkoxides, it has become possible to form alumina bodies of essentially pure alumina. By using such bodies as catalyst supports, one need not compensate for the effect of impurities in determining the amounts or kinds of metals or ions to be used on the supports. It is, therefore, possible to more precisely tailor a catalyst to its intended use.

A problem exists, however, in bonding such pure aluminas into shaped bodies without the use of a binder, particularly bodies having sufficient crush strength and attrition resistance for catalyst applications. To sinter pure alumina, temperatures of at least 1700° C. are required. Although sintering occurs at temperatures as low as 1250° C., the rate of sintering is impractically slow. The sintering temperature can be lowered by the addition of fluxes such as silicon dioxide or alkali-metal oxides. However, these may introduce undesired impurities. Binders can also be used, but they may have their own catalytic activity. Accordingly, a support body free of binders and impurities is preferred.

In addition to purity, another important property of a shaped body used as a catalyst support is the pore size distribution. Pore size of the support often determines catalytic activity towards a particular reaction. Therefore, by regulation of pore size it may be possible to suppress undesirable side-reactions and enhance the desired reaction, thus increasing the yield and purity of the desired product. It is, therefore, desirable for this and other applications to provide for a catalyst support having a narrow pore-size distribution preferably with pores predominately in the micron range.

U.S. Pat. No. 4,048,295 relates to a process for producing formed articles or bodies from aluminum oxyhydrate, particularly extrudates thereof. The aluminum oxyhydrate is peptized with an organic or inorganic acid in a manner known per se and is subsequently mixed with a dilute ammonia solution or with a solution of an $NH_3$-yielding compound. The resulting mass is then extruded, dried and calcined at temperatures of from 500° C. to 600° C. for about 3 hours. As illustrated in Table 2 of this patent, extrudates of aluminum oxyhydrate produced with a solution of $NH_3$-yielding compound have only about 6 percent of the total pore volume with a pore diameter greater than 800 Angstroms.

U.S. Pat. No. 3,950,507 describes a process for the thermal treatment of preformed granules of aluminum hydroxide or active alumina having a porous structure with a pore size of from 20 to 5000 Angstroms. The thermal treatment is carried out by increasing the temperature of from 20° C. to 700° C. for at least 30 minutes, followed by the thermal treatment of the granules at temperatures ranging from 700° C. to 1000° C. for at least 30 minutes, and then at temperatures ranging from 1000° C. to 1400° C. for at least 30 minutes. The thermal treatment of the preformed granules within the temperature range of from 20° C. to 1000° C. is carried out in a hydrogen fluoride atmosphere. The patent states that the process yields granulated porous corundum having a homogeneous pore structure with a predominant pore size of from 5000 to 30,000 Angstroms.

U.S. Pat. No. 3,392,125 discloses alpha-alumina shaped particles or bodies having a pore volume distribution such that a major portion of the pores have a diameter greater than 580 Angstroms. The bodies are suitable for use as a support material for catalysts.

However, none of these references disclose high purity alpha-alumina bodies prepared in accordance with the process of the present invention in which the alpha-alumina bodies are characterized by having at least 85 percent of the pore volume being represented by pores having a diameter of from 10,000 to 200,000 Angstroms and having a surface area less than one square meter per gram.

The present invention provides high purity alpha-alumina bodies free of binders and having a narrow pore size distribution with pores predominantly in the micron range. The high purity alpha-alumina bodies are prepared by peptizing boehmite alumina in an acidic mixture containing fluoride anions and water. Suitable peptizing acids used to prepare the acidic mixture include monofunctional aliphatic carboxylic acids containing from 1 to 5 carbon atoms such as acetic acid, propanoic acid and formic acid or inorganic acids such as nitric acid. The peptizing acid and water are added in a sufficient amount to form an extrudable mixture. Fluoride anions are added preferably in the form of hydrogen fluoride in an effective amount to form the alpha-alumina bodies, preferably in an amount of from about 0.005 to 0.50 grams of fluoride on a 100% HF basis per gram of anhydrous $Al_2O_3$. The extrudable mixtue is extruded to form shaped bodies such as ring-type bodies. The shaped bodies are then optionally dried at a temperature of about 100° C. to 300° C. to reduce the moisture content of the bodies to less than about 30 weight percent. Thereafter, the shaped bodies are calcined at a temperature from 400° C. to 700° C. for a sufficient duration to convert the alumina to the gamma-alumina phase. The bodies in the gamma-alumina phase are further calcined at a temperature from 1200° C. to 1700° C., preferably 1200° C. to 1500° C., for a sufficient duration to convert essentially all of the gamma-alumina of the bodies to the alpha-alumina phase. The high purity alpha-alumina bodies are characterized by a narrow pore size distribution in which at least 85 percent of the total pore volumne comprises pores having a diameter of from 10,000 to 200,000 Angstroms and a surface area less than one square meter per gram.

DISCLOSURE OF INVENTION

In accordance with the present invention, a process is provided for the production of alpha-alumina bodies, which process comprises:

(i) blending a peptizing acid, water and fluoride anions with alumina, said peptizing acid and water being of a sufficient amount to form an extrudable mixture, and said extrudable mixture containing an effective amount of fluoride anions to form the alpha-alumina bodies;

(ii) extruding said extrudable mixture to form shaped bodies;

(iii) calcining said bodies at a temperature from about 400° C. to about 700° C. for a sufficient duration to convert the alumina of said bodies to a gamma-alumina phase; and (iv) calcining said bodies in the gamma-alumina phase at a temperature from about 1200° C. to about 1700° C. for a sufficient duration to convert essentially all the gamma-alumina of said bodies to an alpha-alumina phase such that the alpha-alumina bodies are characterized by having at least 85 percent of the pore volume being represented by pores having a diameter of from 10,000 to 200,000 Angstroms and having a surface area less than one square meter per gram.

This invention further provides a modified process for the production of alpha-alumina bodies which process comprises:

(i) blending a peptizing acid, fluoride anions and water with alumina, said water and peptizing acid being of a sufficient amount to form a first extrudable mixture;

(ii) extruding said first extrudable mixture to form shaped bodies;

(iii) drying said bodies at a temperature from about 100° C. to about 300° C. to reduce the moisture content of said bodies to below 10 weight percent;

(iv) granulating and sizing said bodies to form a grain of from about 20 to 40 mesh U.S. Standard Sieve Screen;

(v) calcining the grain at a temperature from about 400° C. to about 700° C. for a sufficient duration to convert the alumina of said grain to a gamma-alumina phase;

(vi) blending said grain with a mixture comprising an alumina, optionally fluoride anions, a peptizing acid and water, said water and peptizing acid being of a sufficient amount to form a second extrudable mixture, and said second extrudable mixture containing an effective amount of fluoride anions to form the alpha-alumina bodies;

(vii) extruding said second extrudable mixture to form shaped bodies;

(viii) drying said bodies at a temperature from about 100° C. to about 300° C. to reduce the moisture content of said bodies to below 10 weight percent; and (ix) calcining said shaped bodies at a temperature from about 1200° C. to about 1700° C. for a sufficient duration to convert essentially all the gamma-alumina of said bodies to an alpha-alumina phase such that the alpha-alumina bodies are characterized by having at least 85 percent of the pore volume being represented by pores having a diameter of from 10,000 to 200,000 Angstroms and having a surface area less than one square meter per gram.

The invention also provides high purity alpha-alumina bodies prepared in accordance with the process of the present invention in which the alpha-alumina bodies are characterized by having at least 85 percent of the pore volume being represented by pores having a diameter of from 10,000 to 200,000 Angstroms and having a surface area less than one square meter per gram.

The present invention provides for the following advantages and distinctions over the prior art. The alpha-alumina bodies have a narrow pore size distribution in the indicated range and a low surface area. The bodies are bonded without the use of a bonding agent at comparatively low temperatures. The alpha-alumina bodies have high crush strength and are attrition resistant which is desirable for use in catalyst applications. The process of this invention does not involve treatment of preformed shapes, but the bodies of the invention are formed directly from the original mix. The alpha-alumina bodies can conveniently be pre-doped with catalytically active cations without additional treatment. Also, the purity of the bodies allows for impregnation or doping thereof with catalytically active agents, without the need to compensate or allow for the catalytic activity of the impurities.

DETAILED DESCRIPTION

The preferred alumina starting material should be in a finely-divided crystalline form and of the boehmite-type. The preferred boehmite-type aluminas include "CATAPAL SB" available from Conoco Chemicals Division in Houston, Texas, and "PURAL" available from Condea in the Federal Republic of Germany. "Catapal SB" and "Pural SB" are trademarks. A process for making alumina suitable for use in the present invention is disclosed in U.S. Pat. No. 4,202,870. Table A below shows properties of a typical "CATAPAL SB" alumina suitable for use in the present invention.

TABLE A

|    |                              | Wt. %                          |
|----|------------------------------|--------------------------------|
| A. | Analysis                     |                                |
|    | Alumina                      | 75.3                           |
|    | Carbon                       | 0.45                           |
|    | SiO$_2$                      | 0.01                           |
|    | Fe$_2$O$_3$                  | 0.01                           |
|    | Na$_2$O                      | 0.01                           |
|    | TiO$_2$                      | 0.3                            |
|    | Particle Size Distribution:  |                                |
|    | Smaller than 45 microns      | 45.4 wt. %                     |
|    | Larger than 90 microns       | 13.0 wt. %                     |
| C. | Pore Volume (0–800A)*:       | 0.4 ml/gram                    |
| D. | Surface Area*:               | 294 m$^2$/gram                 |
|    |                              | (364 ± 4m$^2$/gram)+           |
| E. | Crystalline Structure:       | Boehmite-type                  |

*After calcination for 3 hours at 900° F.
+After activation at 750° F. for 16 hours using B-E-T method with nitrogen gas.

Other alumina materials may be substituted in whole or in part for the preferred boehmite alumina starting material as long as an extrudable mixture can be formed from the alumina. For example, gamma-alumina can be added to boehmite alumina as detailed in the modified process of this invention and illustrated in working Examples 9 through 12 hereinbelow. In addition, the formed bodies after the drying step or after a calcination step can be sorted and the rejected bodies recycled and mulled with the original alumina and acid mixture. These are variations of the basic process and are within the contemplation of this invention.

The peptizing acid utilized in the process and modified process of this invention is preferably an inorganic acid such as nitric acid, a monofunctional aliphatic carboxylic acid containing from 1 to about 5 carbon atoms such as acetic acid, propanoic acid and formic acid or a halogenated monofunctional aliphatic carboxylic acid containing from 1 to about 5 carbon atoms such as mono-, di-, and trichloro acetic acid and the like and is used to peptize the alumina or to disperse it into a pasty state suitable for extrusion. Other acids may bd suitable, however phosphoric acid and hydrochloric acid were found unsuitable as peptizing agents. The preferred acid for peptizing is acetic acid. Nitric acid is also a preferred acid for use in the modified process of this invention. To provide an extrudable mixture using acetic acid, about 0.01 to 0.03 grams acetic acid (based on 100% acid) per gram alumina starting material (based on anhydrous $Al_2O_3$) are typically used in this invention. Alkali metals, alkaline-earth metals and heavy metals used in the preparation of the acid and present therein may affect the purity and strength of the final alumina product. Accordingly, an acid of reagent grade or equivalent is preferred.

The fluoride anions utilized in the process and modified process of this invention are preferably introduced in the form of hydrogen fluoride. Using hydrogen fluoride will form bodies consisting of essentially pure alpha-alumina. The amount of hydrogen fluoride used is an effective amount to form the alpha-alumina bodies, preferably about 0.005 to 0.50 grams, most preferably about 0.01 to 0.10 grams, of hydrogen fluoride (100% HF basis) per gram of alumina (anhydrous $Al_2O_3$ basis). If it is desirable to "pre-dope" the bodies with any one of various cations, a fluoride salt can be substituted in whole or in part for the hydrogen fluoride to supply the fluoride and also the desired cation. After the calcination step the cation may be retained in the final alpha-alumina body. As an illustration, one or more cations from the following groups can be incorporated into the bodies by using fluoride salts in accordance with the process of this invention: alkali metals (Group IA) such as sodium, lithium, cesium and potassium, alkaline earth metals (Group II A) such as magnesium and barium, Group III A elements such as aluminum, Group IV B elements such as zirconium and titanium, Group VI B elements such as tungsten, molybdenum and chromium, transition metals (Group VIII) such as iron, cobalt and nickel, Group II B elements such as zinc, Group IB elements such as copper, silver and gold, and rare earth metals such as cerium. Additionally, ammonium cations can be incorporated into the bodies by using ammonium fluoride salts. The preferred fluoride salts which can be used in the process of this invention include NaF, LiF, CsF, $PbF_2$, KF, $(NH_4)HF_2$, $MgF_2$, $BaF_2$, $CrF_2$, $(NH_4)F$, $TiF_3$, $FeF_2$, $ZnF_2$ and $CuF_2$.

The blending step of this invention is preferably conducted in a muller. The amount of water used is controlled to form an extrudable mixture. The required amount of water will vary, depending on variables of the properties of the boehmite alumina starting material. For the starting materials contemplated by this invention, a water content in the final extrudable mixture of about 50 to 60 weight percent is typical. Blending is conducted for a sufficient period of time to thoroughly mix the ingredients.

After extruding the extrudable mixture to form shaped bodies according to the process of this invention, the bodies may optionally be dried before calcining to reduce the moisture content to less than about 30 weight percent. However, in carrying out the modified process of this invention, the bodies are dried in both step (iii) and step (viii) described above to reduce the moisture content to below 10 weight percent. During the drying step there is shrinkage of the bodies. A rapid drying rate will possibly lead to cracking and breakage of the bodies. To minimize this possibility, the drying step(s) of the process and modified process of this invention is conducted gradually at a temperature of about 100° C. to 300° C., typically over a period of from about 1 to 24 hours, until the moisture content is reduced to the desired level.

Likewise, during the calcination steps the bodies will shrink. A typical calcination method is to use a direct-fired rotary calciner. This and other often used calciners have a steep temperature gradient at the feed end. If used to directly calcine the dried bodies in the process of the invention, the rapid heating will cause breakage due to shrinkage. It is, therefore, desirable that the calcination be gentle and the bodies not be subjected to rapid increases of temperature. This can be accomplished by a two-step calcination procedure as illustrated in the process of this invention. In the first step the bodies are heated to a temperature of from about 400° C. to 700° C. of sufficient duration to form the gamma-alumina phase. Typically this required at least one-half hour. Thereafter, the bodies are heated to a temperature of about 1200° C. to 1700° C., preferably about 1200° C., for typically at least one-quarter hour, to form the alpha-alumina phase. The modified process of this invention can be accomplished by a one-step final calcination procedure as described in step (ix) above. The bodies are subjected to a prior calcination step, i.e., step (v), before extruding the second extrudable mixture. However, a calcining step at a temperature of from about 400° C. to about 700° C. to convert the alumina of the shaped bodes to a gamma-alumina phase immediately before step (ix) may optionally be employed in the modified process of this invention. A major advantage is that the calcination temperatures are substantially lower than those generally required to sinter pure alumina.

The strength of the alpha-alumina bodies of this invention depends in part on the conditions of the calcination and drying steps and in particular the drying step(s). Although alpha-alumina bodies can be formed after more severe drying and calcining conditions than indicated above, they may not have the desired crush strength and abrasion resistance. The fluoride added to the bodies has the advantage of acting as a fluxing agent to allow sintering of the alumina at lower temperatures than the sintering temperature of pure alumina. Without being bound to any theory, it is through that $AlF_3$ is formed which volatizes at the calcination temperatures and provides a mass transfer mechanism between the particles. As indicated above, calcination is best carried out at a temperature of about 1200° C. to 1700° C., preferably about 1200° C. to 1500° C. In the indicated temperature ranges the bodies will be bonded or sintered and the fluoride will be eventually drive off leaving pure alpha-alumina behind. Although the purity of the bodies depends in large part on the starting materials, the fluoride also provides for some purification, by combining with certain impurities to form compounds that are volatized in the calcination step. As indicated above, the amount of hydrogen fluoride used in the process and modified process of this invention is an effective amount to form the alpha-alumina bodies, preferably about 0.005 to about 0.50 grams, most preferably 0.01 to 0.10 grams, of hydrogen fluoride (100% HF basis) per gram of alumina (anhydrous $Al_2O_3$ basis). In the modified process of this invention, fluoride anions are optionally added to step (vi) described above. because fluoride anions are added in step (i) of the modified process, it is necessary that sufficient fluoride anions remain in blending step (vi) so as to provide preferably about 0.005 to about 0.50 grams, most preferably about 0.01 to 0.10 grams, of hydrogen fluoride (100% HF basis) per gram of alumina (anhydrous Al$_2$O$_3$ basis). If not, fluoride anions may be added in step (vi) of the modified process to make up any deficiency.

The fluoride also has a profound effect on the pore size distribution of the alpha-alumina bodies. When fluoride is not used, bodies having pores over a broad size range with a large proportion of very small pores are produced. When fluoride is used, the resulting bodies have a narrow pore-size distribution, with at least 85% of the pore volume being represented by pores having a diameter between 10,000 and 200,000 Angstroms. These bodies are substantially free from small micropores. The bodies are, therefore, suitable for use in applications requiring a predominance of pores in the micron range. Also affected by the fluoride is the surface area. The use of fluoride results in bodies having a surface area less than 1 m$^2$/gm, which is substantially lower than bodies made without fluoride. The bodies of the process of this invention are characterized, therefore, by having at least 85 percent of the pore volume being represented by pores having a diameter of from 10,000 to 200,000 Angstroms and having a surface area less than one squre meter per gram.

For certain catalyst applications it may be desirable to have also a fraction of the total pore volume represented by relatively large pores in the range of 200,000 to 1,000,000 Agnstroms. This can be accomplished by incorporating carbonaceous "burn-out" masses of specified size in blending step (i) of the process of this invention are blending step (iv) of the modified process of this invention. The alpha-alumina bodies prepared in subsequent steps for each process are characterized by having not greater than 10 percent of the pore volume being represented by pores having a diameter of from 200,000 to 1,000,000 Angstroms. The carbonaceous "burn out" masses are volatilized during calcination to give pores within this desired range. Typical of suitable volatile materials are sugars, starches, cellulose, carbon black, wood flour and gums. See U.S. Pat. No. 3,726,811 and U.S. Pat. No. 3,119,660 for examples of the use of such "burn-out" masses in bodies.

The alumina-bodies of this invention can be extruded into shaped bodies such as rings which are useful as catalyst supports. Table B below illustrates typical properties of high purity alpha-alumina bodies of this invention extruded in the form of rings about 5/16 inches high and 5/16 inches in diameter with a ⅛ inch concentric hole.

TABLE B

| Pore Size Distribution (% of total volume): | |
|---|---|
| (1) 0–10,000 Angstroms | 5 |
| (2) 10,000–200,000 Angstroms | 90 (minimum 85) |
| (3) >200,000 Agnstoms | 5 (not greater than 10) |
| Total Pore Volume, cc/gm | 0.4–0.8 |
| Surface Area, m$^2$/gm | 0.2–0.6 |
| Density, lbs./ft.$^3$ | 35–40 |
| Densiy, gm/cc | 0.56–0.72 |

The pore volume in Table B is given at 50,000 psia. The pore size distribution of the alpha-alumina ring shaped bodies is very narrow. The ring shaped bodies are characterized by having not greater than 10 percent of the pore volume being represented by pores having a diameter of from 200,000 to 1,000,000 Angstroms in addition to having at least 85 percent of the pore volume being represented by pores having a diameter of from 10,000 to 200,000 Angstroms. The ring shaped bodies are also characterized by having a surface area less than one square meter per gram.

Although this invention has been described with respect to a number of details, it is not intended that this invention should be limited thereby. The examples which follow are intended solely to illustrate the embodiments of this invention which to date have been determined and are not intended in any way to limit the scope and the intent of the invention.

As used in the examples appearing hereinafter, the following designations, terms and abbreviations have the indicated meanings:
lbs: pounds
ml: milliliter
gm: gram
hrs.: hours
m$^2$: square meter
min.: minute
cc: cubic centimeter
in.: inch
ft.: foot
conc.: concentration
psia: pounds per squae inch absolute
% or percent: percent by weight unless otherwise specified.
temperatures: are given in °C. unless otherwise specified.
Numbered Examples: illustrate this invention.
Lettered Examples: are comparative examples which do not illustrate this invention The analytical methods used in the Examples are identifed as follows:

Total Pore Volume (cc/gm) and Pore Size Distribution (Angstroms): determined by standared mercury porosimetry techniques. The surface tension of mercury opposes its enterance into pores. The pressure required to force mercury into a pore is a function of the pore size diameter. Therefore, by measuring the volume of mercury forced into the pores at various pressures up to about 50,000 psia, a pore volume and pore size distribution can be derived.

Surface Area (m$^2$/gm): determined by nitrogen/krypton adsorption method, i.e., B-E-T method, as described in Brunauer et al., *J. Am. Chem. Soc.*, 60, 309 (1938).

Abrasion Resistance (%): determined by putting a weighed sample in a Humble abrader drum and rotating the drum at 60 revolutions per minute for 60 minutes. After screening out the fines of less than 50 mesh U.S. Standard Sieve Screen, the sample was reweighed and the percent weight loss or abrasion loss was determined.

Crush Strength (lbs.): determined by randomly choosing 25 alpha-alumina ring shaped bodies and individually pressing them between two flat plates with the axis of the support rings parallel to the plane of the plates. The pressing force on the plates was noted when each of the bodies fractured. The crush strength was then calculated by averaging the measured force for each of the bodies.

EXAMPLE I

The starting alumina material consists of 1000 pounds of boehmite alumina based on the weight of anhydrous Al$_2$O$_3$ which is prepared by the process of U.S. Pat. No. 4,202,870. 200 pounds of this boehmite alumina and 700 pounds of water are mixed in a stainless steel tank by stirring. To this aqueous alumina slurry is supplied a solution comprising 26.9 pounds of hydrogen fluoride based on 100% hydrogen fluoride, 14.7 pounds of acetic acid and 600 pounds of water. The resulting mixture is stirred for 25 minutes at room temperature to peptize the alumina and react the hydrogen fluoride. Thereafter, the peptized material is charged into a muller containing the remaining 800 pounds of boehmite alumina and sufficient water is added to this mixture to produce a cake having a moisture content of about 55 weight percent based on the total weight of the cake. After mulling the cake for 15 minutes, the thoroughly mixed cake is then passed into an auger extruder are shaped using a die combination to produce desired ring shaped bodies about ⅜ inches high an ⅜ inches in diameter with a 5/32 inch concentric hole. Oversized and undersized ring shapes are recycled to the muller and the shaped ring bodies of desired size are dried in an apron dryer at 100° C. for 3 hours to reduce the moisture content of the shaped ring bodies to about 25 weight percent based on the total weight of the ring shaped bodies. The partially dried ring shaped bodies are then calcined by initially firing the bodies in a rotary kiln furnace at a bed temperature of about 700° C. with a retention time of 60 minutes to form ring shaped bodies in the gamma-alumina phase. After the initial firing, a screening step separates any broken ring shaped bodies. A second firing is then conducted in a direct-fired rotary kiln furnace at a bed temperature of about 1200° C. with a retention time of 40 minutes to form ring shaped bodies in the alpha-alumina phase. The alpha-alumina ring shaped bodies are about 5/16 inches high and 5/16 inches in diameter with a ⅛ inch concentric hole. These alpha-alumina ring shaped bodies are characterized by the following typical analyses for pore size distribution, total pore volume, surface area and density:

Pore Size Distribution (% of total volume):
(1) 0-10,000 Angstroms: 5%
(2) 10,000-200,000 Angstroms: 90%
(3) >200,000 Angstroms: 5%
Total Pore Volume (at 50,000 psia): 0.55 cc/gm
Surface Area: 0.35 m$^2$/gm
Density: 37.5 lbs./ft.$^3$

EXAMPLE 2

Alpha-alumina ring shaped bodies were prepared using a procedure similar to Example 1 except that 6000 grams of commercially available CAPAPAL SB boehmite alumina were combined with 300 grams of 49% agueous hydrogen fluoride, 100 grams of 80% acetic acid and 6000 grams of water. After mulling and extruding the mixture to produce ring shaped bodies, the bodies were dried in a box oven for 16 hours at 100° C. The partially dried ring shaped bodies were then calcined by initially firing the bodies in a box furnace at a bed temperaure of about 700° C. with a retention time of 60 minutes to form ring shaped bodies in the gamma-alumina phase. A second firing was then conducted in a box furnace at a bed temperature of about 1200° C. with a retention time of 60 minutes to form ring shaped bodies in the final alpha-alumina phase. These alpha-alumina ring shaped bodies were characterized as having the following properties:

Pore size distribution (% of total volume):
(1) 0-10,000 Angstroms: 2.6%
(2) 10,000-200,000 Angstroms: 93.3%
(3) >200,000 Angstroms: 4.1%
Total Pore Volume (at 50,000 psia): 0.82 cc/gm
Surface Area: 0.30 m$^2$/gm

EXAMPLE A 2041 grams of commercially available CATAPAL SB and 227 grams of commercially available Vanderbilt "Dixie" kaolin were mixed and dry mulled for 5 minutes. After the dry mulling period, 1500 milliliters of water were added to the mixture and mulling continued for an additional 30 minutes. 45.4 grams of hydroxyethyl cellulose were then added and the resulting mixture was extruded, dried and calcined in a manner similar to Example 2. However, the extruded ring shaped bodies were dried in a box oven for 16 hours at 100° C. and then calcined by firing a box furnace at a bed temperature of 1200° F. with a retention time of 1 hour to form ring shaped bodies in the alpha-alumina phase. These alpha-alumina ring shaped bodies were characterized as having the following properties:

Pore Size Distribution (% of total volume):
(1) 0-10,000 Angstroms: 91.8%
(2) 10,000-200,000 Angstroms: 3.7%
(3) >200,000 Angstroms: 4.5%
Total Pore Volume (at 50,000 psia): 0.36 cc/gm

EXAMPLES 3 THROUGH 8

The starting alumina material for each of these Examples consisted of 7918 grams of commercially available PURAL SB boehmite alumina. 1584 grams of this boehmite alumina and 2500 milliliters of water were mixed in a beaker by stirring for each Example. To this aqueous alumina slurry was supplied hydrogen fluoride and acetic acid in amounts specified for each example in Table C. This mixture was charged into a muller containing the remaining 6334 grams of boehmite alumina with water in amounts specified for each Example in Table C. After mulling and extruding the mixture to form ring shaped bodies in a manner similar to Example 1, the bodies were dried for a time and at a temperature given for each Example in Table C. The partially dried ring shaped bodies were then calcined by initially firing the bodies in a rotary kiln furnace for a time and at a bed temperature given for each Example in Table C to form ring shaped bodies in the gamma-alumina phase. A second firing was then conducted in a rotary kiln furnace for a time and at a bed temperature given for each Example in Table C to form ring shaped bodies in the alpha-alumina phase. These alpha-alumina ring shaped bodies prepared in each Example were characterized as having the properties given in Table C. The acetic acid concentration in Table C is given as a weight ratio, i.e., the grams of acetic acid (100% basis) used per gram of the anhydrous boehmite alumina. Also, the hydrogen fluoride concentration in Table C is given as a weight ratio, i.e., the grams of hydrogen fluoride (100% basis) used per gram of the anhydrous boehmite alumina. The total pore volume in Table C is given at 50,000 psia.

TABLE C

| Example | 3 | 4 | 5 | 6 | 7 | 8 |
|---|---|---|---|---|---|---|
| Process Data | | | | | | |
| Acetic Acid Conc. | 0.018 | 0.014 | 0.014 | 0.018 | 0.014 | 0.014 |
| Hydrogen Fluoride Conc. | 0.030 | 0.030 | 0.060 | 0.030 | 0.030 | 0.060 |
| Water Conc., ml | 3500 | 4500 | 3150 | 3500 | 4500 | 3250 |
| Drying Temp., °C. | 100 | 100 | 100 | 100 | 100 | 100 |
| Drying time, hrs | 2 | 3½ | 4 | 3½ | 3½ | 4 |
| #1 Firing Temp., °C. | 700 | 700 | 700 | 700 | 700 | 700 |

TABLE C-continued

| Example | 3 | 4 | 5 | 6 | 7 | 8 |
|---|---|---|---|---|---|---|
| #1 Firing Time, min | 90 | 35 | 35 | 35 | 35 | 35 |
| #2 Firing Temp, °C. | 1200 | 1200 | 1200 | 1300 | 1300 | 1300 |
| #2 Firing Time, hrs | 1 | 1 | 1 | 1 | 1 | 1 |
| Product Data | | | | | | |
| Outside Diameter, in. | 0.317 | 0.307 | 0.320 | 0.315 | 0.309 | 0.322 |
| Crush Strength, lbs | 21 | 16 | 12 | 18 | 27 | 21 |
| Abrasion Loss, wt % | 29.2 | 29.0 | 31.0 | 28.4 | 29.6 | 38.4 |
| Pore size Distribution (% of total volume): | | | | | | |
| (1) 0–10,000 Angstroms | 5.6 | 5.4 | 3.9 | 5.4 | 7.0 | 3.6 |
| (2) 10,000-200,000 Angstroms | 92.6 | 90.0 | 94.5 | 88.1 | 88.2 | 88.3 |
| (3) >200,000 Angstroms | 1.8 | 4.6 | 1.6 | 6.5 | 4.8 | 8.1 |
| Total Pore Volume, cc/gm | 0.57 | 0.58 | 0.57 | 0.61 | 0.60 | 0.64 |
| Surface Area, m$^2$/gm | 0.43 | 0.43 | 0.49 | 0.35 | 0.35 | 0.32 |

EXAMPLE 9

Step I

1882 Pounds of commercially available CATAPAL SB boehmite alumina are mixed with 1882 pounds of water, 56 pounds of nitric acid based on 100% nitric acid and 19 pounds of hydrogen fluoride based on 100% hydrogen fluoride in a muller for 1 hour. The moist cake produced in the muller is extruded into pellets in a manner similar to Example 1. These extruded pellets are dried at 300° C. for 1 hour to reduce the moisture content of the pellets to about 5 weight percent based on the total weight of the extruded pellets. The partially dried pellets are then granulated and screened to recover the desired fraction retained in a 20×40 mesh U.S. Standard Sieve Screen. Oversized material is returned to the granulator and undersized material is recycled back to the mulling operation. The material retained in the desired 20×40 mesh U.S. Standard Sieve Screen is fired in a rotary kiln furnace at 600° C. for 1 hour to convert the material to gamma-alumina phase particles or grain.

Step II

810 Pounds of the gamma-alumina grain prepared in Step I and 235 pounds of commercially available CATAPAL SB boehmite alumina are mixed in a muller for 1 hour with 7 pounds of nitric acid, 2 pounds of hydrogen fluoride and 1000 pounds of water. The moist cake produced in the muller is extruded into ring shaped bodies about ⅜ inches high and ⅜ inches in diameter with a 5/32 inch concentric hole. Oversized and undersized ring shapes are recycled to the muller and the shaped ring bodies of desired size are dried in an apron dryer at 300° C. for 1 hour. The dried ring shaped bodies are then calcined by initially fired the bodies in a rotary kiln furnace at a bed temperature of about 700° C. with a retention time of 60 minutes to form ring shaped bodies in the gamma-alumina phase. The CATAPAL SB boehmite alumina added in Step II is converted to the gamma-alumina phase at this time. After the initial firing, a screening step separates any broken ring shaped bodies. A second firing is then conducted in a direct fired rotary kiln furnace at a bed temperature of about 1500° C. with a retention time of 1 hour to form ring shaped bodies in the alpha-alumina phase. The alpha-alumina ring shaped bodies are about 5/16 inches high and 5/16 inches in diameter with a ⅛ inch concentric hole. These alpha-alumina ring shaped bodies are characterized by the following typical analysis for pore size distribution, total pore volume, surface area and density:

Pore Size Distribution (% of total volume):
  (1) 0–10,000 Angstroms: 5%
  (2) 10,000–200,000 Angstroms: 90%
  (3) >200,000 Angstroms: 5%
Total Pore Volume (at 50,000 psia): 0.55 cc/gm.
Surface Area: 0.35 m$^2$/gm
Density: 37.5 lbs./ft$^3$

EXAMPLES 10 THROUGH 12

Step I

Alpha alumina ring shaped bodies were prepared using a procedure similar to Example 9 except that 3667 grams of commercially available CATAPAL SB boehmite alumina were used in this example. 3000 Grams of this amount were added into the muller and, in a separate glass beaker, the remaining 667 grams of boehmite alumina were mixed with 1000 milliliters of water, 150 grams of hydrogen fluoride and 150 grams of nitric acid and then added to the muller. The resulting mixture in the muller was blended for 30 minutes, at which point 1000 milliliters of water was added and blending continued for another 30 minutes. The moist cake produced in the muller was extruded into pellets about ⅛ inch in diameter and these pellets were dried in a box oven at 100° C. for 1 hour. The dried pellets were then fired in a box furnace at about 700° C. for 1 hour to convert them into the gamma-alumina phase.

Step II 1590 grams of the gamma-alumina pellets prepared in Step I were dry mulled for 5 minutes to a granulated condition. 177 Grams of CATAPAL SB boehmite alumina were separately mixed in a glass beaker with 700 milliliters of water and 44 grams of nitric acid. This mixture was added to the muller containing the gamma-alumina granulated material and blending was conducted for 30 minutes, at which point another 500 milliliters of water were added to the muller, and blending continued for another 30 minutes. The moist cake produced in the muller was extruded into ring shaped bodies through a 25/64 inch tubular die. The resulting ring shaped bodies were then dried in a box oven at 100° C. for 1 hour. Portions of the dried ring shaped bodies were then calcined by firing the bodies in a box furnace at various bed temperatures and retention times given for each Example in Table D below to form ring shaped bodies in the alpha-alumina phase. These alpha-alumina ring shaped bodies were characterized as having the properties described in Table D. A dash indicates that no data is available. The total pore volume in Table D is given at 50,000 psia.

TABLE D

| Example | 10 | 11 | 12 |
|---|---|---|---|
| Process Data | | | |
| Firing Temp., °C. | 1500 | 1200 | 1500 |
| Firing Time, hrs. | 48 | 1 | 17 |
| Product Data | | | |
| Pore Size Distribution (% of total volume): | | | |
| (1) 0–10,000 Angstroms | 3.0 | 5.6 | 3.8 |
| (2) 10,000–200,000 Angstroms | 95.0 | 91.4 | 92.2 |
| (3) >200,000 Angstroms | 2.0 | 3.0 | 4.0 |
| Total Pore Volume, cc/gm | 0.58 | 0.70 | 0.56 |
| Surface Area, m$^2$/gm | 0.32 | 0.50 | — |

We claim:

1. A process for the production of alpha-alumina bodies which comprises:
   (i) blending a peptizing acid, water and fluoride anions with alumina, said peptizing acid and water being of a sufficient amount to form an extrudable mixture, and said extrudable mixture containing an effective amount of fluoride anions to form the alpha-alumina bodies;
   (ii) extruding said extrudable mixture to form shaped bodies;
   (iii) calcining said bodies at a temperature from about 400° C. to about 700° C. for a sufficient duration to convert the alumina of said bodies to a gamma-alumina phase; and
   (iv) calcining said bodies in the gamma-alumina phase at a temperature from about 1200° C. to about 1700° C. for a sufficient duration to convert essentially all the gamma-alumina of said bodies to an alpha-alumina phase, said alpha-alumina bodies characterized by having at least 85 percent of the pore volume being represented by pores having a diameter of form 10,000 to 200,000 Angstroms and having a square area less than one square meter per gram.

2. The process of claim 1 wherein the source of said fluoride anions is one or more from the group consisting of NaF, LiF, CsF, $PbF_2$, KF, $(NH_4)HF_2$, $MgF_2$, $BaF_2$, $CrF_2$, $TiF_3$, $(NH_4)F$, $FeF_2$, $ZnF_2$, $CuF_2$ and HF.

3. The process of claim 2 wherein the source of said fluoride anions is hydrogen fluoride.

4. The process of claim 2 or claim 3 wherein the alumina is of the boehmite type.

5. The process of claim 4 wherein said extrudable mixture contains from about 0.005 to about 0.50 grams of fluoride on a 100% HF basis per gram of anhydrous $Al_2O_3$.

6. The process of claim 1 further comprising drying the shaped bodies of step (ii) at a temperature from about 100° C. to about 300° C. to reduce the moisture content of the bodies to less than about 30 weight percent before step (iii).

7. The process of claim 5 wherein the peptizing acid is a monofunctional aliphatic carboxylic acid containing from 1 to about 5 carbon atoms or a halogenated derivative thereof.

8. The process of claim 7 wherein the peptizing acid is acetic acid.

9. The process of claim 6 wherein the peptizing acid is nitric acid.

10. The process of claim 1 wherein the calcining temperature of step (iv) is about 1200° C. to about 1500° C.

11. The process of claim 7 further comprising blending carbonaceous burn out masses in step (i) to obtain alpha-alumina bodies in step (iv) characterized by having not greater than 10 percent of the pore volume being represented by pores having a diameter of from 200,000 to 1,000,000 Angstroms.

12. A process for the production of alpha-alumina bodies which comprises:
   (i) blending a peptizing acid, fluoride anions and water with alumina, said water and peptizing acid being of a sufficient amount to form a first extrudable mixture;
   (ii) extruding said first extrudable mixture to form shaped bodies;
   (iii) drying said bodies at a temperature from about 100° C. to about 300° C. to reduce the moisture content of said bodies to below 10 weight percent;
   (iv) granulating and sizing said bodies to form a grain of from about 20 to 40 mesh U.S. Standard Sieve Screen;
   (v) calcining the grain at a temperature from about 400° C. to about 700° C. for a sufficient duration to convert the alumina of said grain to a gamma-alumina phase;
   (vi) blending said grain with a mixture comprising alumina, a peptizing acid and water, said water and peptizing acid being of a sufficient amount to form a second extrudable mixture, and said second extrudable mixture containing an effective amount of fluoride anions to form the alpha-alumina bodies;
   (vii) extruding said second extrudable mixture to form shaped bodies;
   (viii) drying said shaped bodies at a temperature from about 100° C. to about 300° C. to reduce the moisture content to less than about 10 weight percent; and
   (ix) calcining said shaped bodies at a temperature from about 1200° C. to about 1700° C. for a sufficient duration to convert essentially all the alumina of said bodies to an alpha-alumina phase, said alpha-alumina bodies characterized by having at least 85 percent of the pore volume being represented by pores having a diameter of from 10,000 to 200,000 Angstroms and having a surface area less than one square meter per gram.

13. The process of claim 12 wherein the source of said flouride anions is one or more from the group consisting of NaF, LiF, CsF, $PbF_2$, KF, $(NH_4)HF_2$, $MgF_2$, $BaF_2$, $CrF_2$, $TiF_3$, $(NH_4)F$, $FeF_2$, $ZnF_2$, $CuF_2$ and HF.

14. The process of claim 13 wherein the source of said fluoride anions is hydrogen fluoride.

15. The process of claim 13 or claim 14 wherein the alumina is of the boehmite type.

16. The process of claim 15 wherein the peptizing acid is nitric acid.

17. The process of claim 16 wherein said second extrudable mixture contains from about 0.005 to about 0.50 grams of fluoride on a 100% HF basis per gram of anhydrous $Al_2O_3$.

18. The process of claim 17 further comprising blending carbonaceous burn-out masses in step (vi) to obtain alpha-alumina bodies in step (ix) characterized by having not greater than 10 percent of the pore volume being represented by pores having a diameter of from 200,000 to 1,000,000 Angstroms.

19. The process of claim 15 wherein the peptizing acid is a monofunctional aliphatic carboxylic acid containing from 1 to about 5 carbon atoms or a halogenated derivative thereof.

20. The process of claim 19 wherein the peptizing acid is acetic acid.

21. The process of claim 12 further comprising calcining the shaped bodies of step (viii) at a temperature from about 400° C. to about 700° C. for a sufficient duration to convert the alumina of said bodies to a gamma-alumina phase before step (ix).

22. The process of claim 12 wherein the calcining temperature of step (ix) is about 1200° C. to about 1500° C.

23. The process of claim 12 wherein fluoride anions are added to step (vi).

* * * * *

UNITED STATES PATENT AND TRADEMARK OFFICE
CERTIFICATE OF CORRECTION

PATENT NO. : 4,379,134
DATED : April 5, 1983
INVENTOR(S) : Willis W. Weber and Joseph A. Herbst It is certified that error appears in the above—identified patent and that said Letters Patent is hereby corrected as shown below:

At column 5, line 5 replace "bd" with --be--.

At column 6, line 24 after "about 1200° C.," insert --to 1500°C,--

Signed and Sealed this

Thirteenth Day of September 1983

[SEAL]

Attest:

Attesting Officer

GERALD J. MOSSINGHOFF
Commissioner of Patents and Trademarks